United States Patent

[11] 3,562,401

| [72] | Inventor | Hugh M. Long |
| | | Tonawanda, N.Y. |
| [21] | Appl. No | 806,011 |
| [22] | Filed | Mar. 3, 1969 |
| [45] | Patented | Feb. 9, 1971 |
| [73] | Assignee | Union Carbide Corporation |
| | | New York, N.Y. |
| | | Continuation of application Ser. No. 642,612, Feb. 27, 1967, now abandoned, which is a continuation-in-part of application Ser. No. 395,953, Sept. 11, 1964, now abandoned. |

[54] LOW TEMPERATURE ELECTRIC TRANSMISSION SYSTEMS
5 Claims, 4 Drawing Figs.

[52] U.S. Cl.................................................... 174/15, 174/27, 174/28

[51] Int. Cl...................................................... H01b 7/34, H01b 9/04

[50] Field of Search............................................ 174/S.C., 8, 14, 15, 15C, 16, 17.11, 24, 27, 28, 29, 37, 99; 333/96, 99 (SUP); 335/216; 29/599; 156/47; 336/250

[56] References Cited
UNITED STATES PATENTS

| 650,987 | 6/1900 | Ostergren | 174/15(C)X |
| 655,838 | 8/1900 | Tesla | 156/47 |
| 2,197,639 | 4/1940 | Hobart | 174/28X |
| 2,215,290 | 9/1940 | Hobart | 174/29X |
| 2,351,520 | 6/1944 | Katzin et al. | 174/28X |
| 2,461,834 | 2/1949 | Morin | 174/29 |
| 3,292,016 | 12/1966 | Kafka | 174/15(C)X |

FOREIGN PATENTS

| 1,368,938 | 6/1964 | France | 336/250 |
| 19,229 | 9/1963 | Japan | 174/(S.C.) |

OTHER REFERENCES

Gilmore, Electronics World, "Cryogenics-Electronics at Ultra-low Temperatures," July 1962, pages 23— 26, 84 and 85. Copy in 335— 216.

McFee, Electrical Engineering, "Applications of Superconductivity to the Generation and Distribution of Electric Power," Feb. 1962, pages 122— 129. Copy in 335— 216.

*Primary Examiner*—Laramie E. Askin
*Attorneys*—Paul A. Rose, Thomas I. O'Brien, John C. Le Fever, Leo A. Plum, Dominic J. Terminello and Eugene Lieberstein

ABSTRACT: This invention provides a low temperature electrical transmission system which is defined by an elongated conduit having at least one electrical conductor internally positioned within said conduit, an outer jacket surrounding said elongated conduit and a circulating cryogenic dielectric cooling liquid located between the electrical conductor and the elongated conduit for simultaneously cooling and electrically insulating the conductor from the conduit and from the outer jacket. Thermal insulation is positioned between the outer jacket and conduit to prevent heat inleakage.

PATENTED FEB 9 1971

INVENTOR.
Hugh M. Long
BY
John C. LeFevre
ATTORNEY

LOW TEMPERATURE ELECTRIC TRANSMISSION SYSTEMS

This application is a continuation-in-part of application Ser. No. 642,612 filed Feb. 27, 1967, which is a continuation-in-part of application Ser. No. 395,953 filed Sept. 11, 1964, both now abandoned.

This invention relates to high power electric transmission systems and particularly to such systems employing transmission lines which use a cooling fluid.

As the consumption of electric power increases both in the United States and abroad, it becomes increasingly necessary to transmit large quantities of electric power at higher voltage levels. As the voltage level of this transmitted power rises, it becomes more difficult to electrically insulate the high potential components of the transmission line from the low or ground potential components in an economical manner.

Cooling power transmission lines to low temperatures has been proposed to increase the capacity of the electrical conductor without requiring voltage increases. It has also been proposed to construct the electrical conductor from a superconducting material and refrigerate such a conductor to about the normal boiling point of liquid helium so that such material can carry a superconducting current. Although both of these proposals provide means capable of transporting electrical power in large quantities, the problems of adequate thermal and electrical insulation have thus far lessened the attractiveness of these proposals.

It is an object of this invention to provide an electric transmission line capable of transporting electrical power in large quantities. Another object is to provide such a line which is adapted to be cooled to low temperatures to enhance the current carrying capacity of the electrical conductor. A further object is to provide such a line having a superconducting electrical conductor adapted to being cooled to temperatures sufficiently low to maintain the conductor in a superconducting state. It is still another object of this invention to provide a cooled transmission line wherein the cooling fluid provides the principal dielectric insulation between the high and low potential components of the line.

These and other objects and advantages of this invention will become apparent from the following description and the accompanying drawings of which:

The transmission line of this invention has a coaxial or colinear construction wherein an elongated electrical conductor is surrounded by a substantially annular zone containing a cooling fluid which also serves as the principal dielectric insulation, and by a larger annular zone containing a thermal insulation which minimizes heat inleakage to the cooling fluid. The cooling fluid may be any gas or liquid which has good dielectric characteristics and will preferably be pressurized to several atmospheres to enhance its dielectric characteristics. The atmospheric gases such as oxygen, nitrogen, argon and hydrogen have good dielectric characteristics, particularly when used as cryogenic fluids to cool the transmission line to low temperatures. Where a high dielectric strength fluid is required a liquid coolant would be preferred, since in general liquids have higher dielectric strength than gases.

To maintain effects of the cooling fluid, the cooling fluid must be circulated through the transmission line. Since gases have a lower density than liquids and therefore less cooling capacity per unit volume, a gaseous coolant will have to be circulated at a higher rate than a liquid coolant. In long transmission lines, the higher required circulation rates for gaseous coolants may require uneconomically high pumping capacity in which case a liquid coolant would be preferred.

Solid dielectrics are used in this invention only to the extent required to physically support the electrical conductor within the transmission line. Thus, the solid dielectrics used in this invention provide a very minor fraction of the total electrical insulation required to insulate the high and low potential components within the transmission line of this invention.

Figure 1:
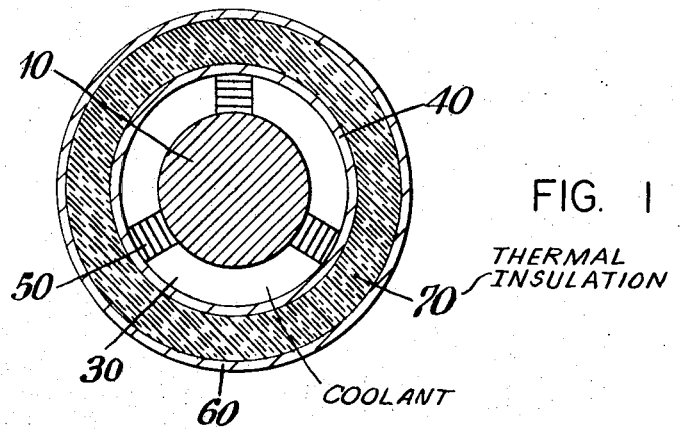
FIG. 1 is a view of a transmission line taken in cross section illustrating one embodiment of this invention.

FIG. 1 depicts a transmission line having a normal electrical conductor 10 which would be constructed of metal in either a solid or a stranded configuration. Conductor 10 is shown supported within a larger concentric conduit 40 by means of solid dielectric supports 50. Conduit 40 is adapted to carry a dielectric cooling fluid within the annulus 30 in contact with conductor 10 to cool and electrically insulate conductor 10. A larger outer jacket 60 is concentrically positioned around conduit 40 and the annulus 70 therebetween is filled with thermal insulation to insulate the cooling fluid from ambient heat inleakage. The thermal insulation within annulus 70 may be a load-bearing type in order to support conduit 40 concentrically within jacket 60. If the thermal insulation is not a load-bearing type, then suitable means (not shown) must be provided to position conduit 40 within jacket 60, such as low thermally conductive pegs positioned in the same manner as the solid dielectric supports 50.

The transmission line depicted in FIG. 1 is particularly suited for use with a cryogenic cooling fluid, for example, liquid nitrogen. If this line is cooled by such a cryogenic fluid, the thermal insulation within annulus 70 would preferably comprise evacuated alternating layers of reflective foil and fiber. This type of insulation is more fully described in U.S. Pat. No. 3,007,596. This combination of a cryogenically-cooled transmission line thermally insulated by the foil-and-fiber type of thermal insulation is feasible because of the use of a high dielectric cooling fluid. Because the dielectric fluid separates the high potential components, namely the conductor 10, from the low potential components, namely the conduit 40 and the thermal insulation and the jacket 60, there is no problem of the foil component of the thermal insulation functioning like a capacitor. If conduit 40 were at high electrical potential, for example, the foil components would function like a capacitor with the result that there would be large energy storage within the annulus 70 and consequently large dielectric losses during the charging and discharging of this energy. There might also be high voltage arcing across annulus 70 which would not only short circuit the conductor 10 but also destroy the thermal insulation within the annulus 70.

Figure 2:
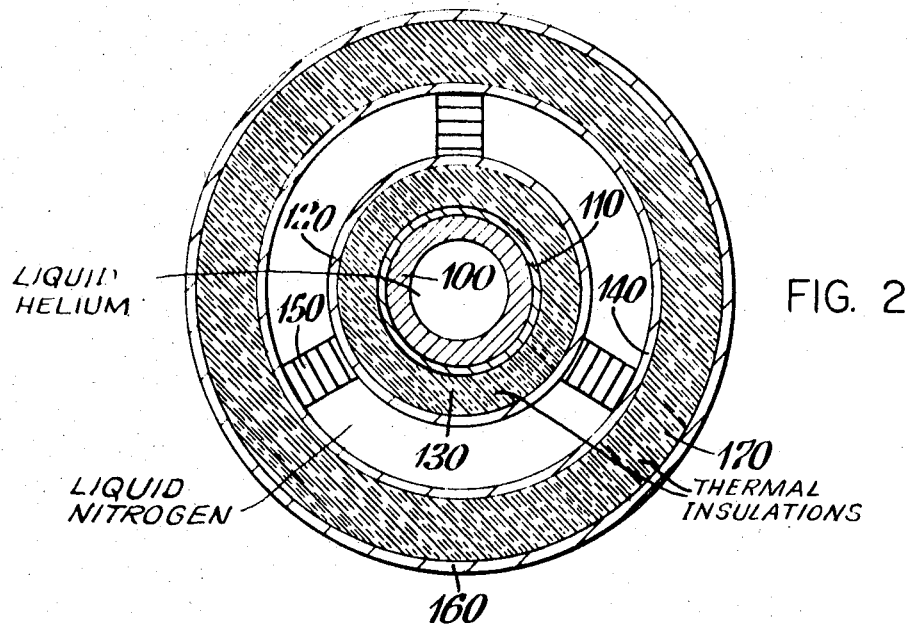
FIG. 2 is a view of a transmission line taken in cross section illustrating another embodiment of this invention.

FIG. 2 depicts a transmission line having a superconducting material 110 supported by an inner conduit 100 which is adapted to transport a low temperature cryogenic fluid such as liquid helium to cool the superconducting material below its critical temperature into its superconducting state. Although conduit 100 could be constructed of superconducting material, it would probably be more economical to coat conduit 100, either on its outer surface as shown or on its inner surface, with the superconducting material 110. In the FIG. 2 embodiment of this invention, the dielectric cooling fluid is contained within an annulus defined by inner and outer concentric conduits 120 and 140, respectively. Conduit 100 may be supported within the inner conduit 120 by means of thermal insulation in annulus 130.

Since the cooling fluid contained between conduits 120 and 140 provides the dielectric barrier, conduit 120 and the thermal insulation in annulus 130 must be at the same high potential as the superconducting material 110 so as to prevent high voltage arcing. If the thermal insulation in annulus 130 is the foil-and-fiber type previously described, the foil could be connected to both the conduit 100 and the conduit 120. Otherwise, some other appropriate electrical connection must be made between these two conduits so that they are at equal electrical potential.

Inner conduit 120 may be concentrically positioned within outer conduit 140 by means of solid dielectric supports 150. Outer conduit 140 may be concentrically positioned within outer jacket 160 by means of load-bearing thermal insulation within the annulus 170.

When a superconductor is provided such as depicted in FIG. 2, the surrounding dielectric cooling fluid would preferably be a cryogenic liquid such as liquid nitrogen to minimize heat inleakage to the low boiling cryogenic liquid used to cool the superconducting material.

By way of example of a superconducting transmission line such as the FIG. 2 embodiment, consider a DC power transmission system designed to carry 10,000 megawatts in two transmission lines where the voltage difference between the electrical conductors of the two lines is 150 kilovolts and the current is 67,000 amperes. This arrangement would permit emergency operation with 5,000 megawatts with one conductor. With hard niobium as the superconductor, the critical magnetic field at 4.2° K. (boiling point of liquid helium) and a current density of 100,000 amperes per square centimeter is 10 kilogauss. Assuming a safety factor of 2.5, the local magnetic field should be no greater than 4 kilogauss. Thus, the required thickness of the superconducting layer should be 0.0138 cm. With this current density of $10^5$ amp/cm$^2$, each meter length of superconductor requires 67 cm$^3$ (570 grams) of niobium and an electrical circuit meter length will require 1.14 kg for the two lines.

The superconductors would be cooled into the superconducting region by pressurized liquid helium and the dielectric cooling fluid would be liquid nitrogen pressurized to 12—15 atmospheres. Both the annulus between the superconductor and the liquid nitrogen and the annulus between the liquid nitrogen and the outer jacket would be vacuum-insulated and contain multilayer insulation of the foil-and-fiber type. Both the liquid helium conduit and the inner conduit of the liquid nitrogen annulus would be at high electrical potential.

Figure 3:
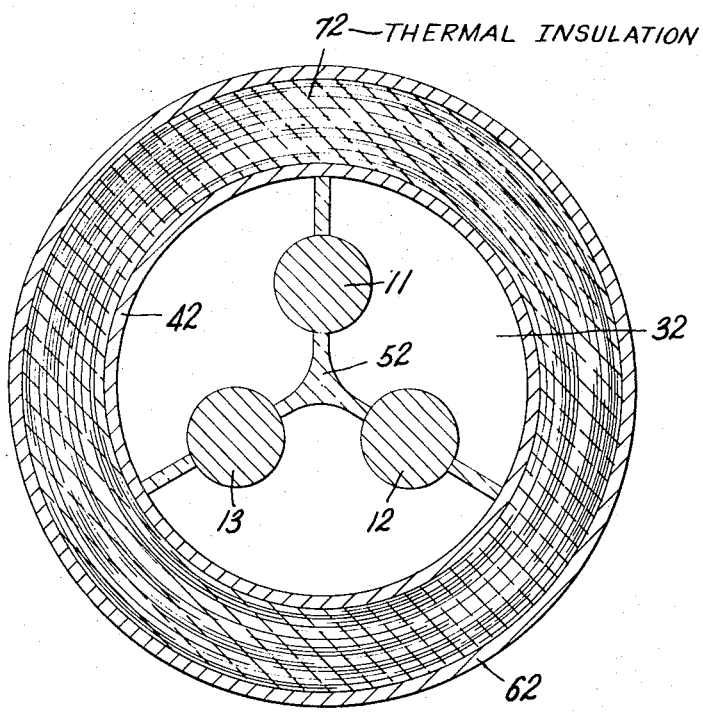
FIG. 3 is a view of a transmission line taken in cross section illustrating still another embodiment of this invention.

FIG. 3 depicts a transmission line having three or more normal electrical conductors 11, 12, 13 which would be constructed of metal in either a solid or stranded arrangement. Conductors 11, 12, and 13 are shown separated from each other and supported within conduit 42 by means of solid dielectric supports 52. The material and shape of the solid dielectric should be selected and its quantity should be minimized to reduce dielectric losses. Conduit 42 which is electrically neutral and usually grounded is adapted to carry a dielectric fluid within the space 32 in contact with conductors 11, 12, and 13 to cool and electrically insulate the conductors. If desired, the conductors 11, 12 and 13 may be made hollow to provide a return flow path for the cryogenic cooling fluid. A larger outer jacket 62 is concentrically positioned around conduit 42, and the annulus 72 therebetween is filled with thermal insulation to insulate the cooling fluid from ambient heat inleakage. The thermal insulation within annulus 72 may be the load-bearing type in order to support conduit 42 concentrically within jacket 62. The dielectric cooling fluid within space 32 separates the high potential components, namely elements 11, 12, and 13, from the low potential components, namely the conduit 42 and the thermal insulation and the outer jacket 62. Similarly as for FIG. 1, if the thermal insulation is not the load-bearing type, then suitable means (not shown) must be provided to position conduit 42 within jacket 62, such as low thermally conductive pegs positioned in the same manner as the solid dielectric supports 50 or 52.

For three-phase superconducting operation, the elements 11, 12 and 13 of FIG. 3 may be replaced with thermally insulated superconductors cooled by a lower boiling cryogenic fluid such as liquid helium. The components of this replacement might be similar to that of elements 100, 110, 120 and 130 of FIG. 2. For such a configuration, the liquid nitrogen in space 32 would perform the function of both coolant and dielectric fluid in accordance with this invention. Alternatively, the dielectric fluid in space 32 of FIG. 3 could be replaced with a lower boiling cryogenic dielectric fluid, such as liquid helium. The heat inleak to this dielectric fluid could be substantially reduced by surrounding jacket 52 with a more expendable refrigerant such as liquid nitrogen.

Figure 4:
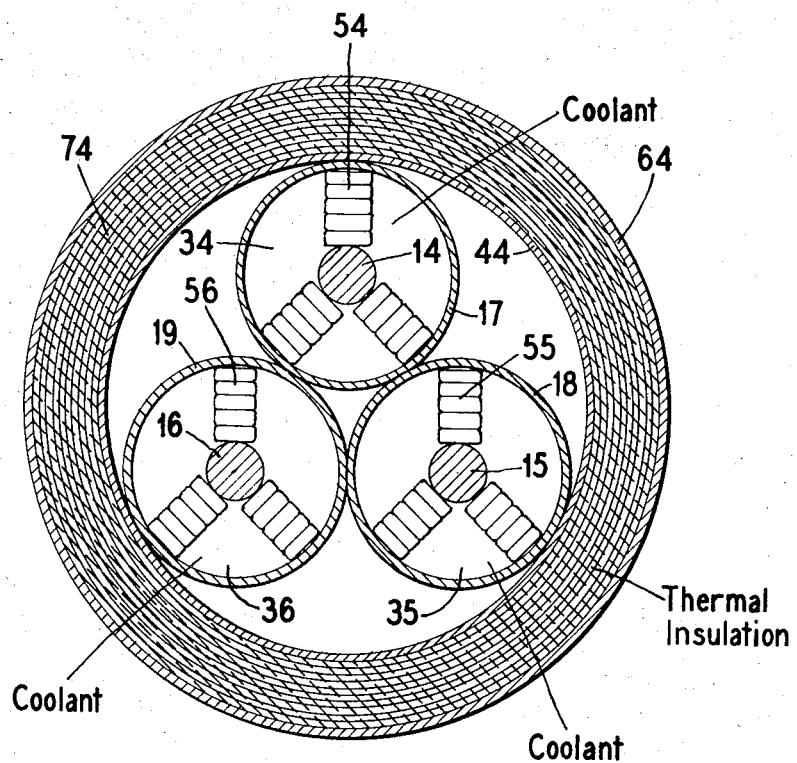
FIG. 4 is a view of a transmission line taken in cross section illustrating a still further embodiment of this invention.

FIG. 4 depicts an improved transmission line having three or more normal or superconducting electrical conductors, each similar to FIG. 1. Conductors 14, 15 and 16 may be constructed of metal in either a solid, stranded, or tubular arrangement, and are shown supported within conduits 17, 18 and 19 by means of solid dielectric supports 54, 55, 56. The material and shape of the solid dielectric supports should be so selected and their quantity should be minimized to reduce dielectric losses. Conduits 17, 18 and 19 which are electrically neutral and usually grounded are adapted to carry a dielectric fluid within the spaces 34, 35 and 36 in contact with conductors 14, 15, and 16 to cool and electrically insulate the conductors. If desired, the conductors 14, 15 and 16 may be made hollow to provide an additional flow path for the cryogenic cooling fluid. The conduits 17, 18 and 19 are positioned within an outer conduit 44 and the space or spaces between 17, 18, 19 and 44 may be used as coolant flow passages. Also, if desired, said conductors may be composites composed of several layers of normal and superconducting materials in electrical contact with each other.

A larger outer jacket 6 is concentrically positioned around the outer conduit 44, and the annulus 74 therebetween is filled with thermal insulation to insulate the cooling fluid from ambient heat inleakage. The thermal insulation within annulus 74 may be the load-bearing type in order to support conduit 44 concentrically within jacket 64. The dielectric cooling fluid within spaces 34, 35 and 36 separates the high potential components, namely elements 14, 15 and 16, from the low potential components, namely the outer conduit 44 and the thermal insulation and the outer jacket 64. Similarly as for FIG. 1, if the thermal insulation is not the load-bearing type, then suitable means (not shown) must be provided to position conduit 44 within jacket 64, such as low thermally conductive pegs positioned in the same manner as the solid dielectric supports 54, 55 and 56.

In all embodiments of this invention as depicted in the FIGS., the solid dielectric support means could be provided as pegs, as shown, or balls or perforated rings installed at suitable intervals to adequately support the electrical conductors. The solid dielectric support could alternately be provided in an elongated form and helically wrapped around the electrical conductor to provide the required support. Suitable materials from which the solid dielectric could be constructed include polytetrafluoroethylene and polyethylene.

In all embodiments of this invention as depicted in the FIGS., suitable conduit means (not shown) would be provided at selected spaced intervals, such as several miles, along the transmission line for introducing cold pressurized fluid and for withdrawing the warmed fluid. When cryogenic liquid is employed, means could also be provided at these withdrawal points to reliquify the withdrawn warm fluid which when depressurized would be a vapor-liquid mixture.

Although certain preferred embodiments of this invention have been described, some features of this invention could be used without others, all within the scope of the invention.

I claim:

1. A low temperature electrical transmission line which comprises an elongated electrical conductor; an elongated conduit positioned around the conductor, the outer surface of said conductor and the inner surface of said conduit forming a substantially annular passage; solid dielectric support means positioned between said conductor and the conduit to physically support said conductor within said conduit; said solid dielectric support means providing a minor fraction of the required dielectric insulation for the transmission line; an elongated outer jacket concentrically positioned around said conduit; thermal insulation positioned within an annulus defined by the outer jacket and said conduit to reduce ambient heat inleakage through said conduit, and means for simultaneously cooling said conductor and electrically insulating the conductor from the conduit and outer jacket.

2. A low temperature electrical transmission line according to claim 1 wherein said means comprises a circulating cryogenic dielectric cooling liquid selected from the group consisting of liquid nitrogen, liquid helium, liquid hydrogen, and liquid oxygen.

3. A superconducting electrical transmission line which comprises an elongated conduit having a superconducting material disposed therealong, said conduit having a stream of a cryogenic fluid maintained therein at a temperature sufficiently low to maintain the superconducting character of the said superconducting material; an elongated inner conduit concentrically positioned around the superconductor and maintained at equal potential with the super conductor-supporting conduit; thermal insulation positioned with an annulus defined by the inner conduit and the superconductor-supporting conduit; an elongated outer conduit positioned around the inner conduit; solid dielectric support means positioned between the inner and outer conduits to physically support the inner conduit within the outer conduit, said dielectric support means providing a minor fraction of the required dielectric insulation between the inner and outer conduits of the transmission line; an elongated outer jacket concentrically positioned around the outer conduit; thermal insulation positioned within an annulus defined by the outer jacket and the outer conduit to reduce ambient heat inleakage through the outer conduit, and a dielectric cooling liquid located between said inner and outer conduits for simultaneously cooling said inner conduit and electrically insulating the inner conduit from said outer conduit and outer jacket.

4. A low temperature electrical transmission line which comprises an elongated conduit; multiple elongated electrical conductors within said conduit, the outer surfaces of said conductors and the inner surface of said conduit forming a fluid passageway; solid dielectric support means positioned between the conductors and the conduit to physically support said conductors within said conduit; said solid dielectric support means providing a minor fraction of the required dielectric insulation between the electrical conductors and the conduit; and elongated outer jacket concentrically positioned around said conduit; thermal insulation positioned within an annulus defined by the outer jacket and said conduit to reduce ambient heat inleakage through said conduit, and a dielectric cooling fluid located in said fluid passageway for simultaneously cooling said electrical conductors and electrically insulating the conductors from said conduit and outer jacket.

5. A low temperature electrical transmission line which comprises; plurality of elongated electrically neutral conduits each containing an electrical conductor, the inner surface of each conduit and the outer surface of the electrical conductor contained therein forming a substantially annular passage; solid dielectric support means positioned within each substantially annular passage for physically supporting each electrical conductor within each conduit respectively, said solid dielectric support means providing a minor fraction of the required dielectric insulation for the transmission line; and outer elongated conduit enclosing said plurality of electrically neutral conduits, said plurality of conduits being nestled together within the confines of said outer conduit; an elongated outer jacket concentrically positioned around said outer conduit; thermal insulation positioned within an annulus defined by the outer jacket and said outer conduit to reduce ambient heat inleakage through said outer conduit, and means for simultaneously cooling each of said electrical conductors and electrically insulating each of said conductors from all of said conduits and said outer jacket respectively, all of said conduits and said outer jacket being at approximately the same potential.